US012586426B1

(12) United States Patent
Herron et al.

(10) Patent No.: US 12,586,426 B1
(45) Date of Patent: Mar. 24, 2026

(54) VEHICLE DIAGNOSTIC SYSTEM AND METHOD WITH VEHICLE CALIBRATION GUIDANCE AND CONFIRMATION

(71) Applicant: Opus IVS, Inc., Ann Arbor, MI (US)

(72) Inventors: Brian J. Herron, Dexter, MI (US); Jay H. Horak, Mesa, AZ (US); David M. Joseph, Ypsilanti, MI (US); Frank M. Terlep, Richardson, TX (US)

(73) Assignee: Opus IVS, Inc., Dexter, MI (US)

( * ) Notice: Subject to any disclaimer, the term of this patent is extended or adjusted under 35 U.S.C. 154(b) by 484 days.

(21) Appl. No.: 17/977,229

(22) Filed: Oct. 31, 2022

Related U.S. Application Data

(63) Continuation-in-part of application No. 17/941,465, filed on Sep. 9, 2022, now Pat. No. 12,412,433, which is a continuation-in-part of application No. 17/515,516, filed on Oct. 31, 2021, now Pat. No. 12,380,747, and a continuation-in-part of application No. 17/509,316, filed on Oct. 25, 2021.

(51) Int. Cl.
*G07C 5/08* (2006.01)
*G07C 5/00* (2006.01)

(52) U.S. Cl.
CPC .......... *G07C 5/0808* (2013.01); *G07C 5/008* (2013.01); *G07C 5/0825* (2013.01); *G07C 5/085* (2013.01); *G07C 2205/02* (2013.01)

(58) Field of Classification Search
CPC .... G07C 5/0808; G07C 5/008; G07C 5/0825; G07C 5/085; G07C 2205/02
See application file for complete search history.

(56) References Cited

U.S. PATENT DOCUMENTS

| | | | |
|---|---|---|---|
| 7,519,458 | B2 | 4/2009 | Buckley |
| 8,589,018 | B2 | 11/2013 | Sarnacke |
| 8,909,416 | B2 | 12/2014 | Chen |
| 8,918,245 | B2 | 12/2014 | Dewhurst |
| 10,152,836 | B2 | 12/2018 | Rozint |
| 11,062,534 | B2 | 7/2021 | Jingle |
| 11,834,056 | B2 | 12/2023 | Patnala |
| 2008/0306645 | A1 | 12/2008 | Dewhurst |
| 2010/0205450 | A1 | 8/2010 | Sarnacke |
| 2011/0112718 | A1 | 5/2011 | Claus |

(Continued)

*Primary Examiner* — Naeem Taslim Alam
(74) *Attorney, Agent, or Firm* — Gardner, Linn, Burkhart Ondersma LLP

(57) ABSTRACT

A system and method of calibrating vehicle safety systems utilizes a vehicle diagnostic computer tool that is configured to be connected to a diagnostic port of a vehicle to be in communication with an electronic system of the vehicle to determine vehicle safety systems present on the vehicle and generating a list of vehicle safety systems that require calibration. Calibration instructions are provided via the computer tool for selected safety systems requiring calibration, with the computer tool receiving and recording calibration confirmation signals while the vehicle safety system is calibrated per the calibration instructions, where the calibration confirmation signals corresponding to steps of the calibration instructions and provide an indication that the associated step has been completed. The system and method thus enable confirmation and documentation of the proper completion of a static or dynamic calibration of an electronic system of the vehicle.

18 Claims, 11 Drawing Sheets

(56) References Cited

U.S. PATENT DOCUMENTS

| | | | | |
|---|---|---|---|---|
| 2017/0301154 | A1 | 10/2017 | Rozint | |
| 2019/0120946 | A1* | 4/2019 | Wheeler | G06T 7/13 |
| 2020/0074767 | A1 | 3/2020 | Cavalli | |
| 2020/0130188 | A1* | 4/2020 | Lawrence | G01S 7/4972 |
| 2021/0354707 | A1* | 11/2021 | Patnala | G07C 5/0808 |
| 2022/0024470 | A1 | 1/2022 | Patnala | |
| 2022/0157088 | A1* | 5/2022 | Pham | H04L 67/12 |
| 2022/0194412 | A1* | 6/2022 | Zhang | B60W 60/001 |
| 2023/0028919 | A1* | 1/2023 | Haeusler | G06T 7/13 |
| 2023/0410366 | A1* | 12/2023 | Liang | G01S 7/4026 |
| 2024/0046225 | A1* | 2/2024 | Balan | G07C 5/0808 |

* cited by examiner

VEHICLE DIAGNOSTIC SYSTEM AND METHOD WITH VEHICLE CALIBRATION GUIDANCE AND CONFIRMATION

CROSS REFERENCE TO RELATED APPLICATION

The present application is a continuation-in-part of U.S. application Ser. No. 17/941,465, filed on Sep. 9, 2022, which is a continuation-in-part of U.S. application Ser. No. 17/515,516, filed on Oct. 31, 2021, and is a continuation-in-part of U.S. application Ser. No. 17/509,316, filed on Oct. 25, 2021, which are all hereby incorporated herein by reference in their entireties.

BACKGROUND OF THE INVENTION

The present invention is directed to a vehicle diagnostic system and method, and in particular to a vehicle diagnostic system that verifies that the required calibration of electronic systems equipped on the vehicle have been performed and meet specifications, and generates a report of the verification.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an OEM or an aftermarket diagnostic company. Certain electronic systems on vehicles require calibration after they have been repaired, such as vehicle safety systems including ADAS systems, such as after a vehicle has been in a collision.

SUMMARY OF THE INVENTION

The present invention provides a vehicle diagnostic system and method, and in particular a diagnostic system that utilizes a vehicle diagnostic computer tool to verify proper completion of calibration of electronic systems of a vehicle, such as calibration of vehicle safety systems after the systems have been repaired, including when such systems are calibrated using aftermarket processes and/or programs, and including for both static calibration operations and dynamic calibration operations.

A method of calibrating vehicle safety systems on a vehicle in accordance with the present invention involves providing a vehicle diagnostic system comprising a vehicle diagnostic computer tool that is configured to be connected to a diagnostic port of a vehicle to be in communication with an electronic system of the vehicle, determining vehicle safety systems present on the vehicle via the vehicle diagnostic computer tool, and generating a list of one or more vehicle safety systems equipped on the vehicle requiring calibration. The method further involves providing via the vehicle diagnostic computer tool the list of vehicle safety systems equipped on the vehicle requiring calibration, providing calibration instructions for a selected one of the vehicle safety systems via the vehicle diagnostic computer tool that provide directions for calibration of the selected one of the vehicle safety systems requiring calibration. The method further contemplates receiving and recording calibration confirmation signals with the vehicle diagnostic computer tool while the vehicle safety system is calibrated per the calibration instructions, where the calibration confirmation signals corresponding to steps of the calibration instructions and provide an indication that the associated step has been completed.

In accordance with a particular embodiment the method further comprises confirming completion of the calibration of the vehicle safety system upon receiving all expected and predetermined calibration confirmation signals associated with the calibration. The calibration may be a static or a dynamic calibration. The calibration confirmation signals may be received via a manual entry to the diagnostic computer tool by the user, or may be detected by the diagnostic computer tool from the vehicle electronic system.

In a preferred embodiment the vehicle diagnostic computer tool includes a display screen for displaying the list of vehicle safety systems equipped on the vehicle requiring calibration. The method may further include providing user selectable links to the specific calibration instructions for the selected one of the vehicle safety systems via the display screen. The calibration instructions may be retained in a memory of the vehicle diagnostic computer tool, or may be retained at a remote computer and be accessed by the vehicle diagnostic computer tool via an internet connection.

The method further includes generating a log data report comprising the recorded calibration confirmation signals. The report may be generated at the vehicle diagnostic computer tool and transmitted to a remote computer. Alternatively and/or additionally, the received and recorded confirmation signals may be transmitted to a remote computer at which the log data report is generated.

A system for calibrating vehicle safety systems on a vehicle in accordance with the present invention comprises a vehicle diagnostic computer tool that includes a display screen and is configured to be connected to a diagnostic port of a vehicle to be in communication with an electronic system of the vehicle. The vehicle diagnostic tool is further configured to determine vehicle safety systems present on the vehicle and display a list of vehicle safety systems equipped on the vehicle requiring calibration. The vehicle diagnostic tool is operable to provide a link to calibration instructions for at least selected ones of the vehicle safety systems requiring calibration, with the vehicle diagnostic tool being configured to receive and record calibration confirmation signals during calibration of vehicle safety systems per the calibration instructions, where the calibration confirmation signals correspond to steps of the calibration instructions and provide an indication that the associated step has been completed.

In a particular embodiment the vehicle diagnostic computer tool is configured to confirm completion of the calibration of the selected vehicle safety system upon receiving all expected and predetermined calibration confirmation signals associated with the calibration. The calibration confirmation signals may comprise manual entries to the diagnostic computer tool by the user or may be detected by the vehicle diagnostic computer tool from the vehicle electronic system.

Still further, the vehicle diagnostic computer tool provides user selectable links to specific calibration instructions for a selected vehicle safety system requiring calibration. The vehicle diagnostic computer tool may accesses the calibration instruction from memory of the vehicle diagnostic computer tool and/or from a remote computer, such as via an internet connection.

The vehicle diagnostic computer tool is further configured to generate a log data report comprising the recorded calibration confirmation signals.

The system and method of calibrating vehicle safety systems of the present invention enables confirmation and documentation of the proper completion of a static or dynamic calibration of an electronic system of a vehicle, such as calibration of vehicle safety systems after the systems have been repaired, including when such systems are calibrated using aftermarket processes and/or programs. Data regarding the calibration process is recorded and may be used or included in a report. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
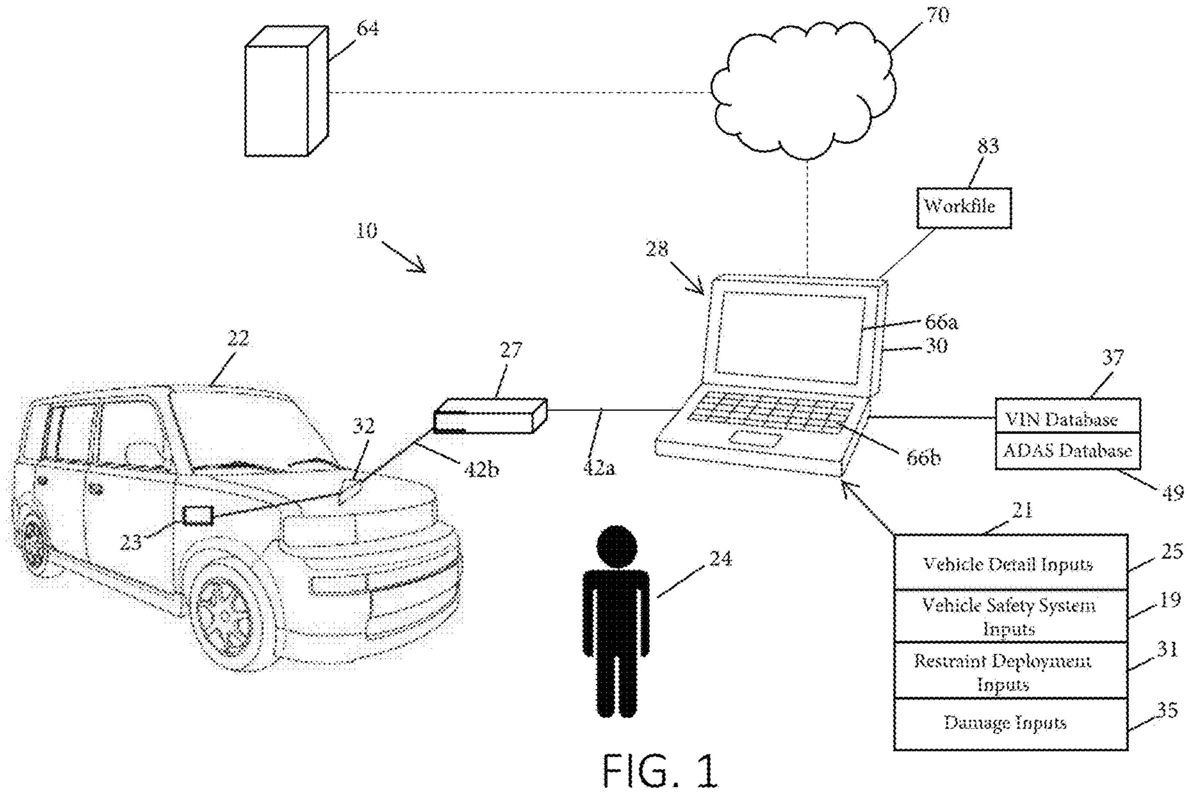
FIG. 1 is a diagram of a vehicle diagnostic system in accordance with the present invention showing a vehicle diagnostic computer tool connected to the electronic system of a vehicle via a vehicle interface device.
Figure 2:
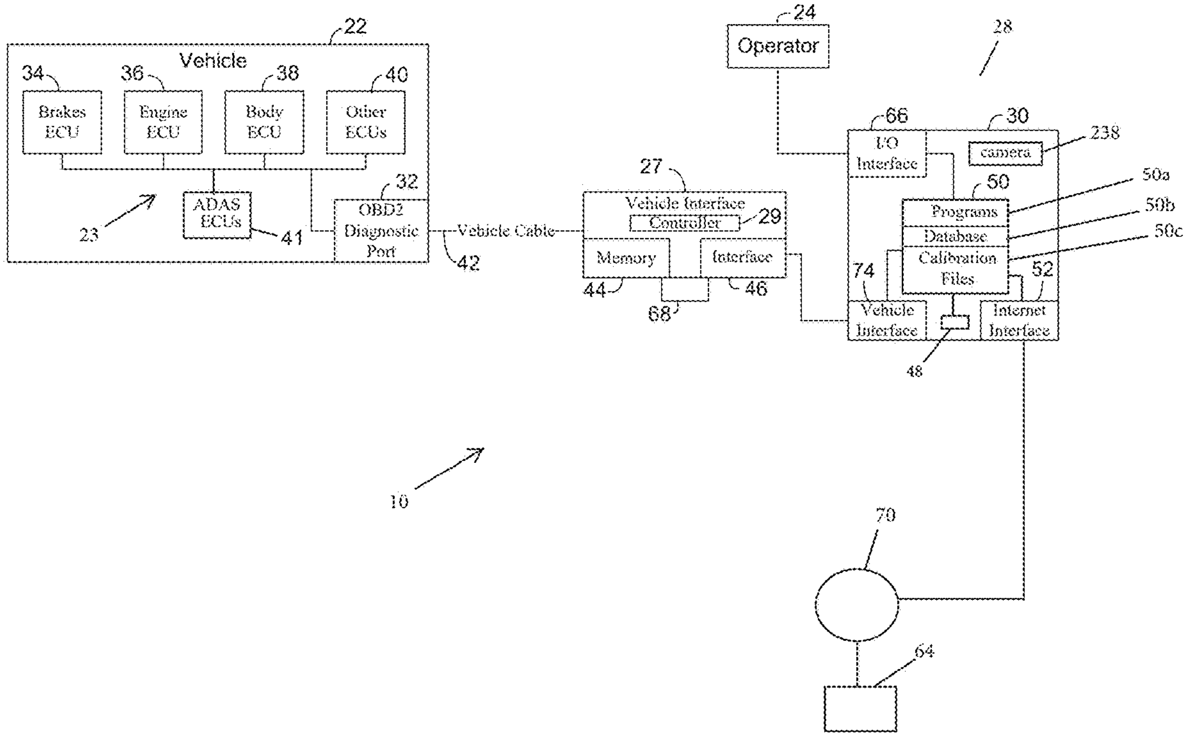
FIG. 2 is a block diagram of the vehicle diagnostic system in accordance with the present invention in relation to the electronic system of the vehicle.

A vehicle diagnostic system 10 for use with a vehicle 22 is shown for use by a user such as a mechanic or operator 24, such as in an automotive repair facility. System 10 is illustrated in FIGS. 1 and 2 as including a vehicle diagnostic computer tool 28, which as discussed in more detail below, is connected with vehicle 22 by operator 24 in order to diagnose the electronic system 23 of vehicle 22, including various vehicle electronic control units (ECUs), including safety systems such as Adaptive Driver Assistance Systems ("ADAS") ECUs, and including other electronic parts and components of vehicle 22. Vehicle diagnostic tool 28 may be used to scan the electronic system 23 of vehicle 22, such as to determine any fault codes in the electronic system 23, which may be reported as diagnostic trouble codes ("DTCs"). A vehicle scan may be run prior to repairs, such as part of an initial diagnosis to provide an indication to the mechanic 24 as to what repairs are needed on vehicle 22, and/or may be run after performing repairs, such as to confirm that vehicle 22 has been properly repaired. Calibration of particular vehicle systems is required as part of repairing such systems, such as after components have been replaced or physically adjusted on a vehicle, including when they have been removed and replaced. This includes vehicle safety systems, such as in particular ADAS systems. As discussed in more detail below, diagnostic computer tool 28 additionally supports calibration operations for the repair of such systems, including static calibrations and dynamic calibrations, and is operable to verify that the electronic vehicle systems requiring calibration have been properly calibrated.

Figure 4:
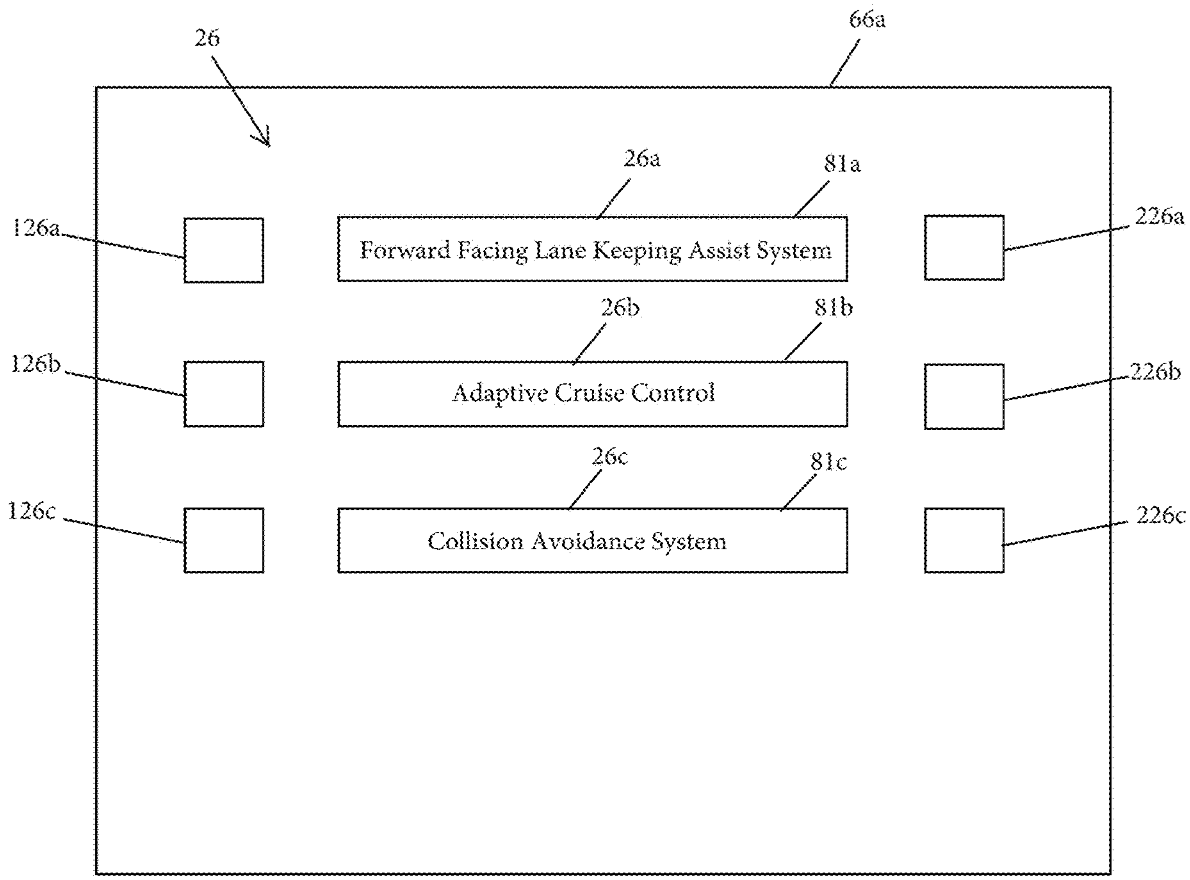
FIG. 4 illustrates a vehicle system checklist displayed to a mechanic on a computer device that is generated by the vehicle diagnostic system in accordance with aspects of the present invention.

As discussed in more detail below, diagnostic computer tool 28 is configured to determine the electronic vehicle systems with ECUs equipped on vehicle 22, such as in particular safety systems, including ADAS systems, and is further configured to receive inputs 35 corresponding to damage to vehicle 22, such as from a collision, with the diagnostic computer tool 28 in turn generating a vehicle system list or system checklist 26 (FIG. 4) identifying and presenting to the mechanic 24 electronic vehicle systems of vehicle 22 that may need calibration, where the status of completion of the indicated calibrations can be readily tracked and recorded to confirm completion of repairs. According to still additional features, diagnostic computer tool 28 may support calibration functions of various electronic vehicle systems of vehicle 22, with the system checklist 26 in turn including an identification for the mechanic 24 of the supported calibration functions from which the mechanic 24 can select and launch using diagnostic computer tool 28.

As discussed in more detail below, diagnostic system 10 utilizing diagnostic computer tool 28 is thus operable based on inputs to diagnostic tool 28 to provide a checklist 26 to mechanic 24 of systems on vehicle 22 with ECUs, such as safety systems including ADAS systems and airbag modules, that may require calibration based on the determined configuration of vehicle 22 and damage thereto, with diagnostic tool 28 additionally identifying for mechanic 24 any such systems for which diagnostic tool 28 supports calibration for that vehicle 22. The checklist 26 is generated by a system list or system checklist program 45 that may additionally be configured to communicate with one or more remote computer systems, such as with a sever 64 via an Internet connection 70, including for example to confirm completion of calibrations and to automatically toggle items on the checklist 26 as completed when calibrations have been performed. It should be appreciated, however, that diagnostic computer tool 28 may itself be able to confirm completion of calibrations and automatically toggle items on checklist 26, such as for calibration operations supported on diagnostic computer tool 28.

Vehicle diagnostic computer tool 28 is configured in the illustrated embodiment as comprising a computer device 30, such as a laptop or tablet computer that includes circuitry, hardware and software, and is coupled with a vehicle interface module 27 by a cable 42_a_. In use, tool 28 is connected with vehicle 22 by operator 24, such as by connecting to an on-board diagnostic ("OBD") diagnostic port 32 of the vehicle 22 in order to diagnose the electronic system 23 of vehicle 22, including the various noted vehicle systems comprising vehicle electronic control units (ECUs), such as an engine ECU 34, body ECU 36, brakes ECU 38, and/or other ECUs 40, including for safety systems such as ADAS ECUs 41, and including other electronic parts and components of vehicle 22, including other safety systems such as airbag modules and the like. Tool 28 connects with port 32 via interface 27, such as via vehicle cable 42*b*. Vehicle interface 27 includes a controller 29, such as in the form of a processor or micro-processor and interface circuitry to facilitate communication between the ECUs and tool 28, with interface 27 including a database of vehicle protocols found in a local memory 44 that allow communication with the ECUs of various makes and models of vehicles. Vehicle interface 27 additionally includes an interface 46 for communication between interface module 27 and computer 30 via interface 74 of computer 30, where computer 30 additionally includes a controller 48 and memory 50. Diagnostic tool 28 additionally includes a user interface 66, which may comprise a touch screen 66*a* and/or keyboard 66*b* of computer 30 enabling mechanic 24 to enter information into diagnostic tool 28, as well as view information output by diagnostic tool 28. As understood from FIGS. 1 and 2, vehicle diagnostic tool 28 may be connected to a remote computer, such as a server 64, such as by an Internet 70 connection. Although vehicle diagnostic computer tool 28 is shown as comprising a separate computer 30 coupled with vehicle interface device 27 in the illustrated embodiment, it should be appreciated that in an alternative arrangement computer 30 and vehicle interface device 27 may be integrated together, such as for example, in an arrangement such as disclosed in commonly assigned U.S. patent application Ser. No. 16/701,967, which is incorporated herein by reference in its entirety.

Vehicle diagnostic system 10 may be configured to be selectively operable in one of a plurality of different modes, whereby a technician may use the diagnostic tool 28 for vehicle maintenance, diagnosis, programming and repair as needed. In the illustrated embodiment, and as understood from FIGS. 2 and 3 in accordance with an embodiment of the present invention, system 10 includes or provides access to various programs 50*a* comprising diagnostic applications, such as stored in a memory 50 of diagnostic computer tool 28, including system list program 45, a diagnostic evaluation program application 51, and commercially available diagnostic application scanning programs 53*a*, 53*b* that are configured for use with the specific vehicle 22 and may be used or selected by a mechanic 24. In the illustrated embodiment diagnostic application program 53*a* comprises an aftermarket scan program and diagnostic application program 53*b* comprises an OE scan program. Although shown as having two diagnostic application programs 53*a*, 53*b*, it should be appreciated that system 10 may include more than two such programs available for use with a given vehicle 22 and/or including additional diagnostic application programs for use with other vehicles, depending on make, model and/or year of a given vehicle. Interface module 27 may be configured as an SAE standard J2534 device, such as a device compliant with the J2534-2 standard, or as an ISO compliant or other standard compliant device for supporting and enabling communication with the electronic systems of a vehicle.

Figure 3:
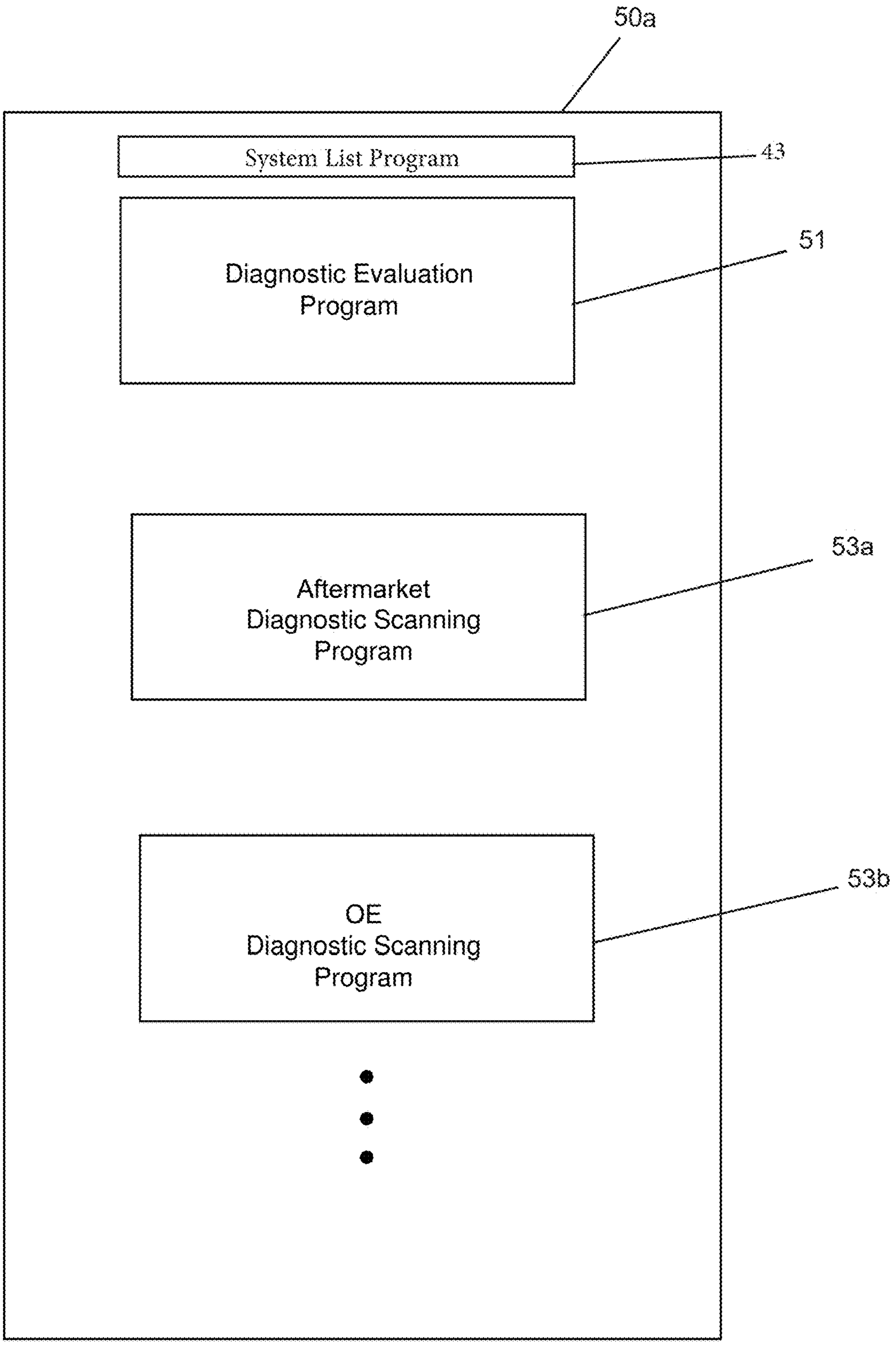
FIG. 3 is a block diagram of programs stored in memory, including a system checklist program, diagnostic evaluation program, and diagnostic scanning program applications of the vehicle diagnostic system of FIG. 1.

As illustrated in FIGS. 2 and 3, the diagnostic application scanning programs 53*a*, 53*b* are stored in a memory 50. An exemplary aftermarket diagnostic application scanning program 53*a* comprises a program provided by an automotive manufacturer or a company that supplies diagnostic application programs, such as Opus IVS, Inc. of Ann Arbor, Michigan, and the OE diagnostic application scanning program 53*b* comprises a program provided by a domestic or foreign OEM, such as Ford, General Motors, Toyota or the like, with the diagnostic application scanning tool 28 configured to enable the reading and reporting of fault codes in the electronic system of the vehicle such as may be located in ECUs of the vehicle. As noted, in practice, memory 50 may include multiple diagnostic application programs, each for use with various makes and/or models of vehicles to enable diagnosing and programming of ECUs via vehicle interface module 27, including depending on the particular vehicle systems/ECUs on the vehicle installed by the OEM based on the vehicle purchaser's selection of vehicle options. Alternatively and/or additionally, memory 50 may include diagnostic application programs that may be used with multiple variations of vehicles. Vehicle interface module 27 and computer 30 are thus cooperatively used for querying/scanning and diagnosing ECUs of vehicle 22, including for accessing error codes generated by the ECUs for assessing and diagnosing operational and performance related aspects of the vehicle 22.

As illustrated in FIG. 1, diagnostic tool 28 may receive various inputs 21 that are used, including by system list program 45, to generate the checklist 26. In the illustrated embodiment this may include vehicle detail inputs 25, vehicle safety system configuration inputs 19, restraint deployment status inputs 31, and vehicle damage inputs 35.

Vehicle detail inputs 25 may comprise various information, including the make, model and/or year of the vehicle 22. The vehicle detail inputs 25 may further or alternatively include the vehicle identification number ("VIN") of the vehicle 22. The vehicle detail inputs 25 may be manually entered by mechanic into diagnostic tool 28, such as via touch screen 66*a* or keyboard 66*b*. Alternatively, vehicle detail inputs 25 may be obtained by diagnostic tool 28 by reading from electronic system 23, where diagnostic tool 28 may query electronic system 23, such as to obtain the VIN. System 10 may further employ a VIN database 37 via which specifics of vehicle 22 may be ascertained by diagnostic tool 28. For example, VIN database 37 may be used to determine the make, model and/or year of vehicle 22 via the VIN.

Safety system inputs 19 are provided to or are determined by diagnostic computer tool 28 to identify the safety systems equipped on the vehicle, including ADAS systems and airbag modules on vehicle 22, such as the safety systems on the vehicle as built or equipped by the vehicle manufacturer when built, or the existing safety systems on the vehicle. It should be appreciated that different vehicles may be equipped with different ECUs when built, including that some vehicles of the same make/model may have different or additional ECUs when compared to other vehicles of the same make/model, such as based on options or equipment packages. For example, a given vehicle may be sold with or without various advanced driver-assistance systems (ADAS), such as adaptive cruise control, lane departure warning, parking assistance, blind spot detection, collision avoidance, forward collision warning, surround view, automatic parking, and other driver assistance systems or other vehicle options. Each ADAS subsystem may include its own additional ECUs, or an ECU may be shared for more than one ADAS feature, where such additional ECUs must be queried/scanned, accessed, and then assessed. In particular, such safety systems may require calibration, such as to confirm proper operation, including if such systems required repair or replacement as a result of collision damage. In accordance with aspects of the present invention, therefore, prior to generating a checklist 26 for providing a mechanic 24, an evaluation may be performed to determine the vehicle systems present on the subject vehicle whereby the checklist 26 may be generated to only include systems that are on the specific vehicle 22 at issue, including based on the particular systems/ECUs present on the vehicle and/or any particular damage that occurred to vehicle 22, such as from a collision. The configuration of vehicle safety systems of a vehicle may be ascertained via an onboard or offboard determination.

Safety system inputs 19 may be obtained in a number of ways, including using either one or more onboard databases or offboard databases. In one onboard configuration, diagnostic tool 28 includes a diagnostic evaluation program application 51 (FIG. 3) for querying/scanning the vehicle 22 to read vehicle data information regarding the particular ECUs that are present on the vehicle, with the vehicle data information being analyzed or parsed to determine the particular vehicle systems provided on the vehicle based on the particular ECUs that are detected. In particular, system 10 determines whether vehicle 22 includes particular safety systems, such as any ADAS systems based on the particular ECUs that are detected. Accordingly, prior to generating a checklist 26 for a given vehicle, a diagnostic evaluation program 51 may initially be run to read or obtain vehicle data information related to the equipped vehicle systems on the vehicle. In one embodiment, vehicle diagnostic tool 28 includes an onboard memory or database **50*b* that includes known ECUs that may be present on a vehicle, including ECUs for ADAS systems on a vehicle. Diagnostic evaluation program 51 is run to determine the ECUs that are present on the vehicle 22, where the detected ECUs may be compared to the known ECUs identified in database 50*b* that may be present, whereby the particular ECUs present on vehicle 22 may be identified. In one embodiment, information contained within database 50*b* includes information regarding addresses within electrical system 23 for the potential ECUs of vehicle 22, where the addresses may be specified, for example, by a bus address, such as a unique memory address or CAN address for the various addresses of the ECUs. For example, database 50*b* may include information regarding each possible ECU that was available for a given make and model of vehicle, such as by year, including for all potential options, including ADAS systems, including the specific ECU for each possible module and the address within electrical system 23 that such ECU is located. Diagnostic evaluation program 51 may operate to query each address of electrical system 23 at which an ECU may be present, such as by sending an inquiry signal to such addresses, where system 10 is able to confirm the presence of a given ECU for such addresses if a response signal is received from an ECU at the given address. Moreover, system 10 is able to identify the particular ECU, including whether the ECU is an ADAS ECU based on the address, which identification information may be stored in database 50*b* along with the given address. For example, each potential ECU of a given make and model of vehicle, including by year or years, may be mapped out such that database 50*b* includes the address of each ECU, and may also include the specific operation, purpose or function of the ECU, such as by part number, name, or the like. System 10 may serially query addresses of electrical system 23 to determine the presence of particular ECUs, including ADAS ECUs, or may alternatively broadcast inquiry signals to multiple or all potential addresses in parallel. Still further, rather than query each ECU within the electronic system 23, system 10 may be configured to query only for ADAS ECUs. In such a configuration database 50*b* may only contain ECU addresses for ADAS systems. Still further, as discussed in more detail below, a remote or offboard database may be employed for determining the safety systems present on vehicle 22, where for example, a database such as database 50*b* may be disposed at a remote computer, such as server 64**.

In an alternative configuration or operation, system 10 may obtain safety system inputs 19 by determining the ADAS systems present on vehicle 22 by way of build data from the vehicle database **50*b* that comprises a VIN database. For example, the diagnostic evaluation program 51 may obtain the vehicle VIN upon connection of system 10 with vehicle 22. As a first step, system 10 via the vehicle diagnostic tool 28 may initially acquire a vehicle identification number (VIN) associated with a vehicle under test. In an aspect of the present invention, the diagnostic tool 28 is operable to read the VIN from the vehicle 22 via its connection through the OBD2 diagnostic port 32. The vehicle VIN may then be used to determine the vehicle systems equipped on the vehicle, such as via VIN database 50*b*, where for example, computer 30 may include database 50*b* that is operatively used to determine the vehicle systems on the vehicle based on the determined VIN. This may include an algorithmic lookup table based on the identified VIN, such as for example where certain alphanumeric characters of the VIN identify the presence or absence of particular vehicle systems present on the vehicle, such as ADAS systems or other vehicle or safety systems. Alternatively, the VIN for the vehicle 22 may be acquired through alternative means and directly input by the operator 24, such as by being visually examined and input via interface 66, such as by way of a keyboard or touch screen. Moreover, rather than a lookup VIN database, the system 20 may operatively algorithmically analyze selected alphanumerical characters, such as by position number in the VIN, with the system 20 recognizing based on the particular character and location the presence or absence of particular vehicle systems present on the vehicle, such as being preprogrammed. This may include, for example, an operator initially entering a make and model of a vehicle via interface 66 whereby the system 20 is preconfigured to read particular characters in particular locations of the VIN in order to determine the presence or absence of particular vehicle systems present on the vehicle. Again, as noted below, rather than being configured as an onboard database, database 50*b* may alternatively comprise an offboard database, such as residing at remote server 64**.

Figure 3A:
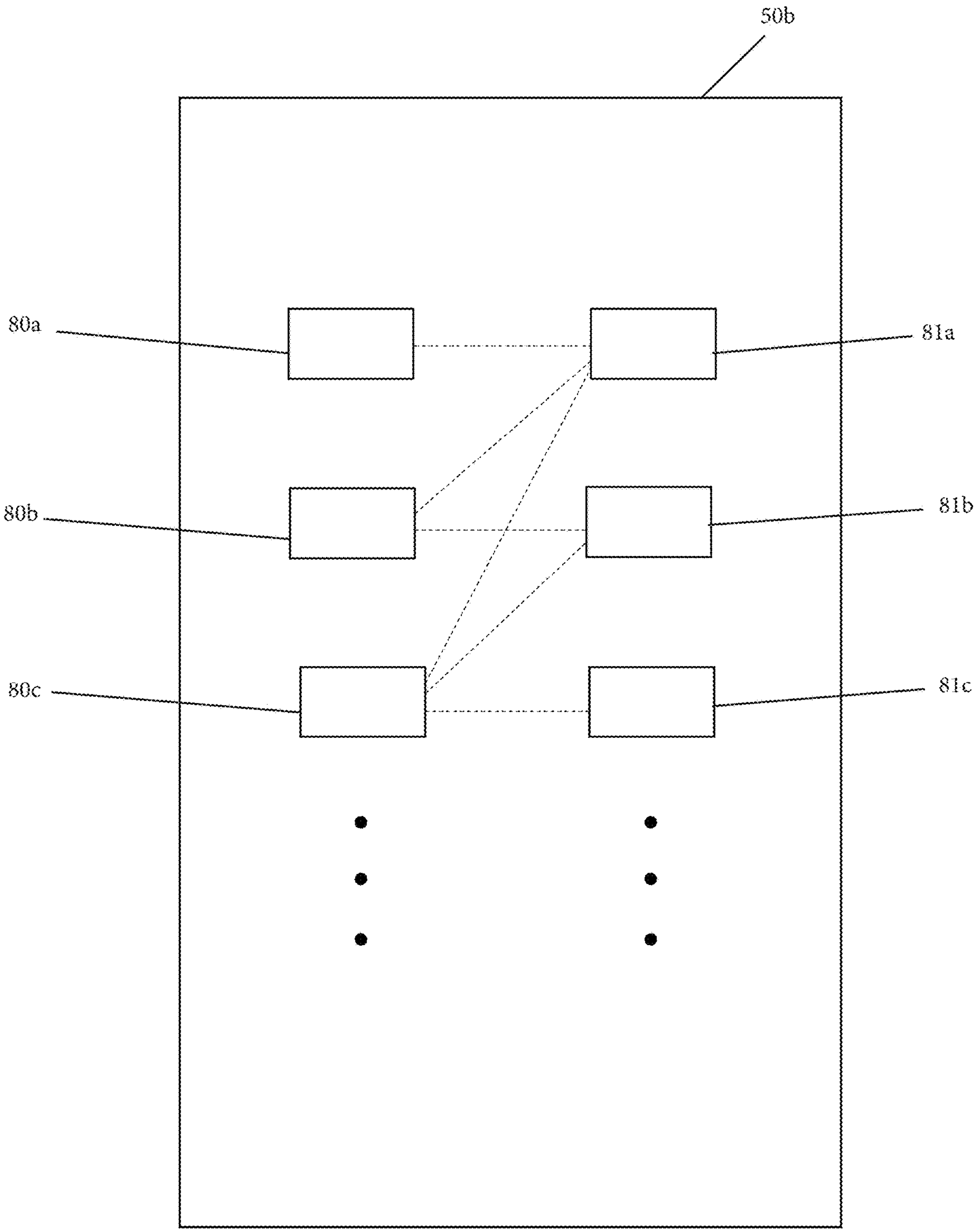
FIG. 3A discloses an exemplary database correlating vehicle identification number data to vehicle systems for a vehicle.

An exemplary embodiment of a database **50*b* configured as a VIN database is illustrated in FIG. 3A, such as for one particular make and model of vehicle. As there shown, database 50*b* includes a listing of VIN data 80*a*, 80*b*, 80*c*, where VIN data may comprise complete VIN numbers, ranges of VIN numbers, or selected portions or ranges of VIN numbers for a given make and model vehicle, with the VIN data 80*a*, 80*b*, 80*c* being correlated with vehicle systems 81*a*, 81*b*, 81*c*, where the vehicle systems 81*a*, 81*b*, 81*c* in the illustrated embodiment are ADAS systems such as a forward facing lane keeping assist system, an adaptive cruise control system, and a collision avoidance system. It should be appreciated that although database 50*b* is illustrated in FIG. 3A to include three separate VIN data designations and three separate vehicle systems, that in practice the VIN database may include numerous listings of VIN data as well as numerous vehicle systems. The vehicle database 50*b* may further comprise a VIN/ECU part number database that includes a listing of ECU part numbers associated with a given VIN, such as based on build data, including such as may be provide by an OEM. Accordingly, generation of checklist 26** may be based in part upon a review of the VIN database and/or a review of the ECU part numbers associated with the current vehicle's VIN.

Still further, safety system inputs 19 comprising the ADAS systems present on a vehicle may be obtained by way of vehicle database 50*b* based on the year, make and model of a vehicle 22. In such a configuration the vehicle database 50*b* may identify the possible ADAS systems on vehicle 22 based on the year, make and model of vehicle 22. As noted above, this may be acquired via diagnostic tool 28 reading the electronic system 23, or may be entered by the mechanic 24, such as via screen 66*a*.

Although database 50*b* is shown as being within memory 50 of computer device 30, it should be appreciated that database 50*b* may alternatively be remotely located, such as at server 64 and accessible via internet connection 70.

It should be further appreciated that in the step of determining the presence of the particular ECUs on the vehicle 22, that the absence of a response signal from an ECU at a given address, such as an ADAS ECU, may mean either that the module and ECU was not present on the vehicle, i.e. it was not originally equipped with the ADAS module and associated ECUs, or that the module having such ECU has been damaged. For example, in the case of a vehicle that has been damaged, such as by a collision, it is possible that the vehicle may have been equipped with particular vehicle systems or modules having ECUs, such as ADAS ECUs, but that due to the damage to the vehicle the diagnostic evaluation program 51 may not be able to detect all of the ECUs due to the vehicle damage. For example, a vehicle may be equipped with certain exterior cameras, radar or ultrasonic sensors, or other ADAS equipment. If such components are damaged in a collision, and or associated controllers are damaged in a collision, then diagnostic evaluation program 51 may inadvertently infer that such systems were not present on vehicle when instead they are not responding or detectable due to the damage. As such, in accordance with a further aspect of the present invention, inputs 21 of system 10 may additionally include inputs 35 related to damaged areas of vehicle 22 whereby system 10 takes into consideration the damage and the potentially effected vehicle systems and associated ECUs, including ADAS systems and associated ADAS ECUs. With reference to FIG. 1, damage information inputs are noted at 35 in FIG. 1.

Damage information inputs 35 may be provided to system 10 via one or more various sources. In one configuration, one or more images representative of the particular vehicle 22 being diagnosed may be shown on screen 66*a* of diagnostic tool 28 where, for example, based on a detected VIN, diagnostic tool 28 may display an image representative of the make, model and year of vehicle 22. The mechanic 24 may then be prompted to interact with the displayed image, such as with screen 66*a* being configured as a touchscreen, to designate or highlight on the displayed image the location or locations corresponding to any actual damage on vehicle 22. Alternatively, in another configuration system 10 may obtain digital images or photographs of the actual vehicle 22 requiring repair and, via image recognition software, determine the location or locations of damage on vehicle 22. Such digital images may be provided to system 10 from a separate camera, or for example, diagnostic tool 28 may include an integrated camera or imager, such as a CMOS imager, with which to take digital images of vehicle 22, with image recognition software residing in computer module 30, such as in memory 50. Still further, in yet another configuration system 10 may interface with a collision estimating software program, such as via an API exchange, whereby system 10 may receive a predetermined evaluation of any damage to vehicle 22, including to specific vehicle systems whereby the damaged ADAS modules are determined. For example, information regarding physical damage to a vehicle via is illustrated as being provided to diagnostic tool 28 from a collision estimating software residing on a separate computer 65 in FIG. 1. It should be appreciated that the collision estimating software may alternatively reside on diagnostic tool 28 itself, or be accessed directly via diagnostic tool 28.

As also understood from FIG. 1, an additional input 21 comprises restraint deployment inputs 31. Restraint deployment inputs 31 include an identification of whether or not one or more of the vehicle airbags have been deployed, which may be entered by a mechanic 24 into diagnostic tool 28 by way of a visual inspection of vehicle 22, with diagnostic tool 28 providing a prompt to direct and allow entry of a response by mechanic 24. Alternatively, diagnostic tool 28 may be used to perform or run a pre-scan diagnostic application program, which may be a limited pre-scan, that determines if any trouble codes for the vehicle airbags are detected indicating that airbags on vehicle 22 have been deployed. The restraint deployment inputs 31 may additionally include an identification of whether or not one or more of a seat belt tensioner or pretensioner has been activated or deployed. For example, some vehicles include electronic seat belt pretensioners that utilize an explosive charge and include an ECU for providing tension to a seatbelt in the event a collision is detected. Accordingly, in like manner to determining deployment of airbags, deployment of seatbelt pretensioner restraints may be determined by visual inspection by mechanic 24 and entry into diagnostic tool 28, or by use of diagnostic tool 28 to perform a pre-scan to detect trouble codes indicating deployment of the seatbelt pretensioner system.

It should be appreciated that the ADAS system identification herein for purposes of the present invention may include or encompass identification of airbag modules requiring programming, and that calibration for purposes of the present invention may include or encompass the programming of the airbag modules.

Upon determining the safety systems and damage present on vehicle 22, system list program 45 is operable to generate checklist 26 that in one embodiment is presented to mechanic 24 on screen 66 of computer 30. As understood from FIG. 4, in the illustrated embodiment checklist 26 includes buttons or display fields 26*a*, 26*b*, 26*c* listing various vehicle systems 81*a*, 81*b*, 81*c*, which comprise ADAS safety systems that have been identified via system list program 45 as being present on vehicle and associated with damage to vehicle 22, and which accordingly may require calibration operations to be performed by the mechanic 24, where the systems 81*a*, 81*b*, 81*c* would include various ADAS ECUs 41. That is, the vehicle systems 81*a*, 81*b*, 81*c* are or include components that are disposed in locations in which damage has been identified on vehicle 22, where in the illustrated embodiment the ADAS systems comprise a forward facing lane keeping assist system 81*a*, an adaptive cruise control system 81*b*, and a collision avoidance system 81*c*. It should be appreciated that each of these ADAS systems may comprise numerous components, including for example various cameras, radar modules and associated ECUs, and that various of such components may be utilized on more than one given ADAS system. Calibration operations for the ADAS systems 81*a*, 81*b*, 81*c* may be performed by the mechanic 24 such as part of the repair and/or replacement of components of such ADAS systems and/or to confirm operation of the systems.

Checklist 26 in the illustrated embodiment additionally includes buttons or display fields 126*a*, 126*b*, 126*c* associated with each of the ADAS systems 81*a*, 81*b*, 81*c* that are operable to provide an indicator to the mechanic as to whether or not each of the systems 81*a*, 81*b*, 81*c* have been calibrated, where fields 126*a*, 126*b*, 126*c* may be toggled from not calibrated to completed upon performance of the appropriate calibration or calibration procedure for the given ADAS system. Still further, checklist 26 may include additional buttons or fields 226*a*, 226*b*, 226*c* associated with each of the ADAS systems 81*a*, 81*b*, 81*c* displayed on the checklist 26 that indicate whether or not the diagnostic computer tool 28 supports calibration of the associated ADAS system 81*a*, 81*b*, 81*c*. Moreover, if diagnostic computer tool 28 supports calibration of the given ADAS system, mechanic 24 may click the associated button 226*a*, 226*b*, 226*c* for that supported ADAS system and launch directly to the calibration function or support function for the given ADAS system. This beneficially avoids the mechanic 24 from having to navigate through to alternative programs, including avoiding having to enter information to access the appropriate calibration materials for a given ADAS system.

Figure 3B:
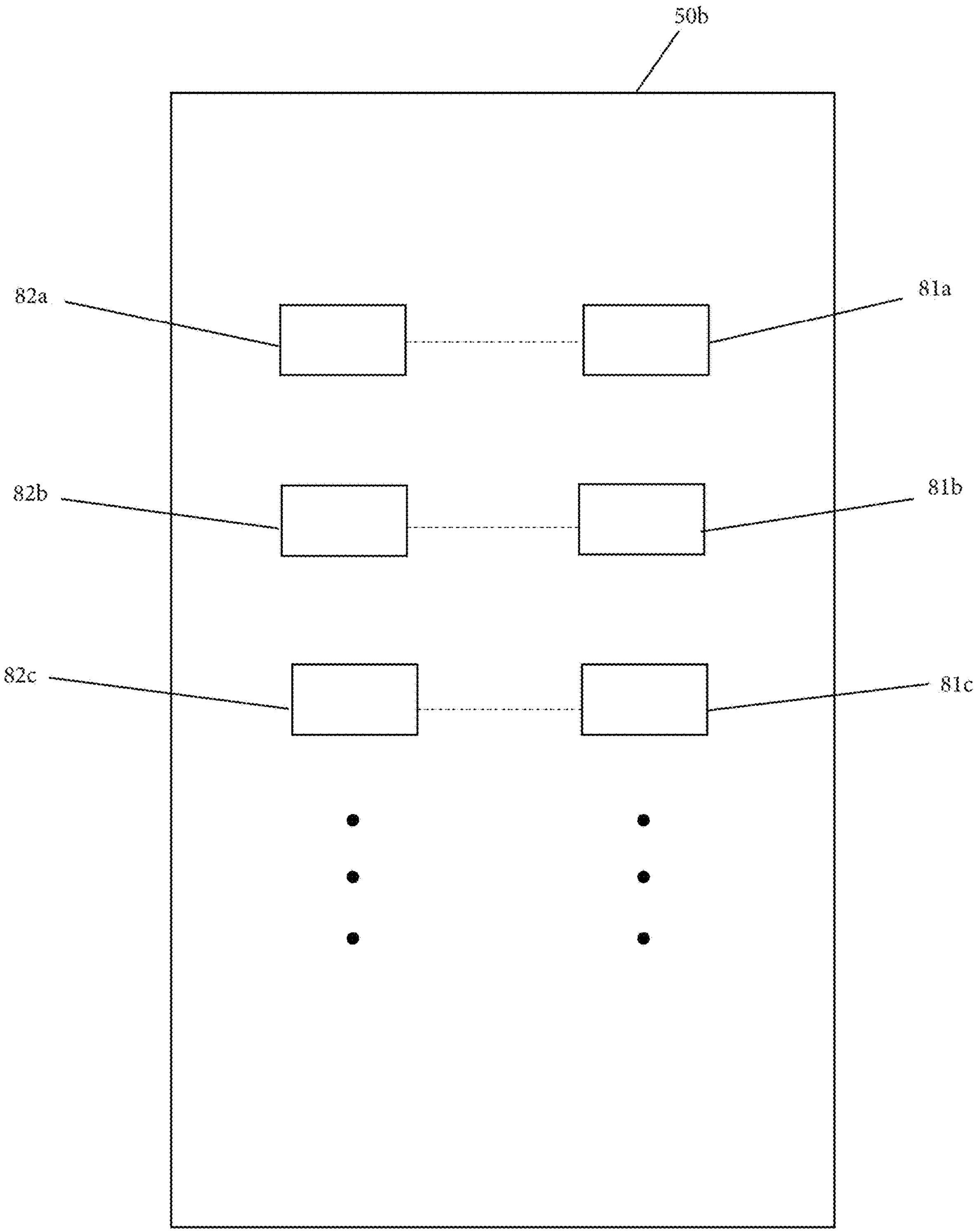
FIG. 3B discloses an exemplary database correlating vehicle identification number data to vehicle systems for a vehicle.
Figure 3C:
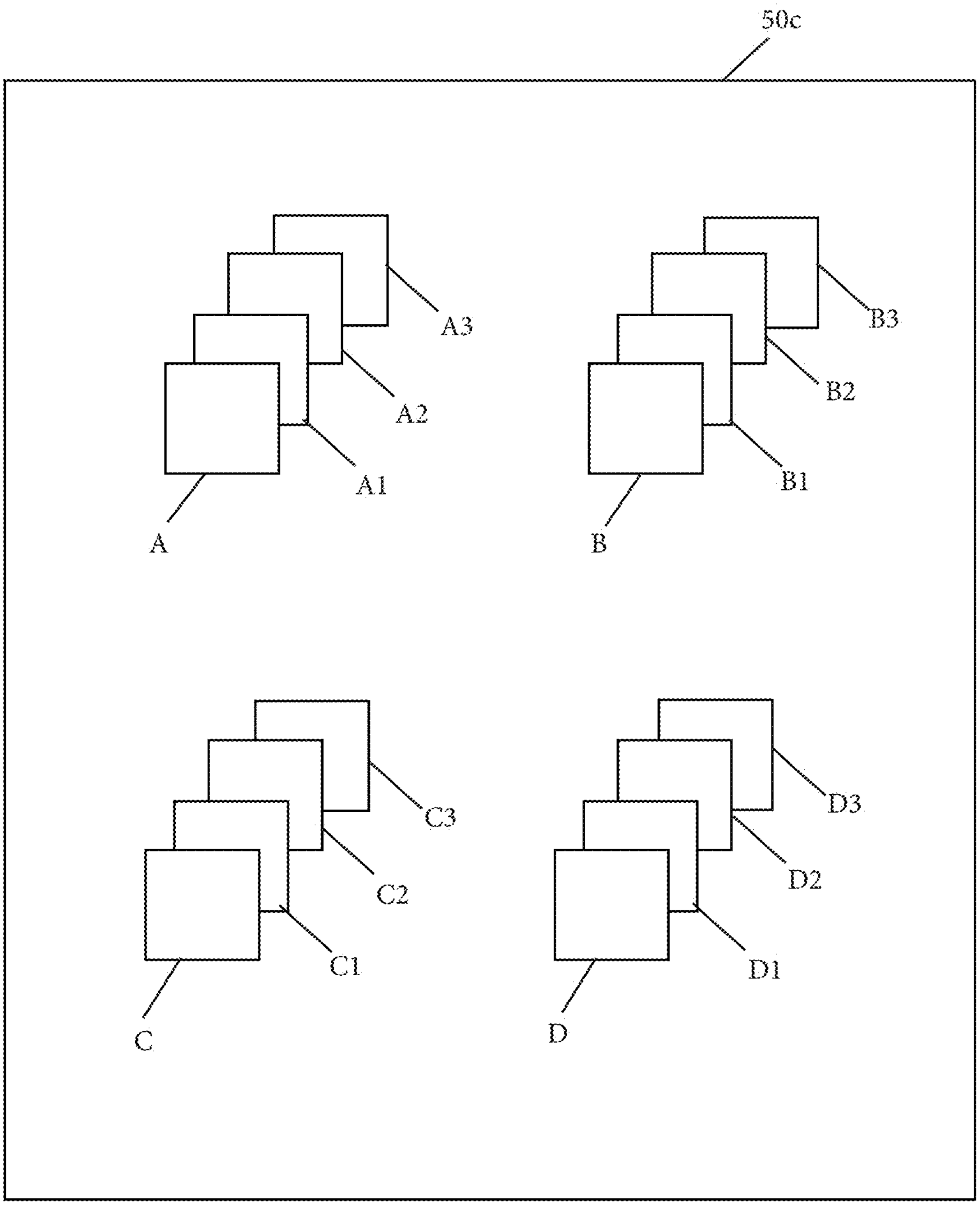
FIG. 3C discloses exemplary electronic calibration files for calibration of vehicle ADAS systems.

For example, with reference to FIGS. 2 and 3C, diagnostic computer tool 28 may include stored electronic calibration data 50*c* retained within memory 50 for support of calibration of one or more ADAS systems, such as systems 81*a*, 81*b*, 81*c*. It should be appreciated that the calibration operation for a given ADAS system 81*a*, 81*b*, 81*c* may be dependent upon the given system as well as the year, make and model of vehicle 22 at issue. Accordingly, memory 50 may include distinct electronically stored calibration data or information, such as shown at A, B, C, D in FIG. 3C, for use in calibrating various different ADAS systems, where the stored calibration data may comprise one or more various calibration related instruction files or programs, such as illustrated as A1, A2, B1, B2, C1, C2, D1 and D2. Although shown in the illustrated embodiment as being located in memory 50, it should be appreciated that some or all of the calibration data 50*c* may be remotely located, such as in server 64, and accessible via Internet connection 70.

In operation, the electronic calibration data 50*c* provides instruction files to a mechanic 24 comprising human readable information that may be displayed on screen 66*a* or printed for calibration of the given ADAS system and/or provides executable calibration programs that interact with ECUs of the ADAS system for conducting, completing and confirming calibration of the ADAS system. With respect to the illustrated embodiment of FIG. 4, for example, fields 226*a*, 226*b*, 226*c* indicate that diagnostic computer tool 28 supports calibration operations for the given ADAS systems 81*a*, 81*b*, 81*c* indicated at 26*a*, 26*b*, 26*c* as requiring calibration. Mechanic 24 may launch particular calibration support data 50*c* by selecting one of the associated fields 226*a*, 226*b*, 226*c*, where this may be done in any of various manners, such as via depressing a touchscreen or selecting via a cursor such as with a mouse. Upon selecting one of the associated supported fields 226*a*, 226*b*, 226*c* to directly launch an associated calibration instruction file, such as A1, screen 66*a* may provide instructions to mechanic 24 regarding the calibration procedure for the given ADAS system. This may include, for example, providing a list of step-by-step instructions for the mechanic 24 to undertake to calibrate the given ADAS system, this includes identifying the particular equipment needed, such as targets for sensors of the ADAS system, as well as the location in which to position the targets and/or vehicle relative to each other. Still further, electronic calibration data 50*c* may include calibration programs, such as OEM and/or aftermarket ADAS calibration programs, for running on ADAS ECUs 41 as part of the calibration process. For example, the ADAS calibration program may be run via vehicle interface 27 on electronic system 23. Diagnostic computer tool 28 may also require or prompt mechanic 24 to verify completion of each given step, such as by way of entry via screen 66*a* and/or keyboard 66*b*. Completion of the various steps may be confirmed in various ways, including for example where completion of some or all of the steps is automatically monitored by diagnostic computer tool 28 and/or by confirmation entries by mechanic 24 via diagnostic computer tool 28. The ADAS calibration routine may additionally include running of calibration programs, such as program A2 for a given ADAS system. The calibration program may interface with an ECU in any of various known manners, including sending a command to begin a learn function with diagnostic computer tool 28 waiting for a response from the ECU indicating completion, or the calibration program may transmit persistent messages to an ECU for calibration, or the calibration program in diagnostic computer tool 28 may trigger or activate an internal OEM program of the ECU used for calibration.

As noted, diagnostic computer tool 28 is operable to verify that calibration for a given safety system 81*a*, 81*b*, 81*c* has been properly completed. This includes both for systems requiring a static calibration as well as for systems that require a dynamic calibration, where in a static calibration the vehicle 22 is not driven and in a dynamic calibration requires the vehicle to be driven, and where the type of calibration required is dependent on the particular safety system and the associated sensors. In the case of either a static calibration or a dynamic calibration, the operator 24 launches a calibration process supported by the diagnostic computer tool 28 via the associated button or field 226*a*, 226*b*, 226*c*, as discussed above, which may involve depressing a touch screen, clicking with a mouse, highlighting and activating a field via a key stroke or other button on tool 28, or in another known computer interface manner.

Figure 5:
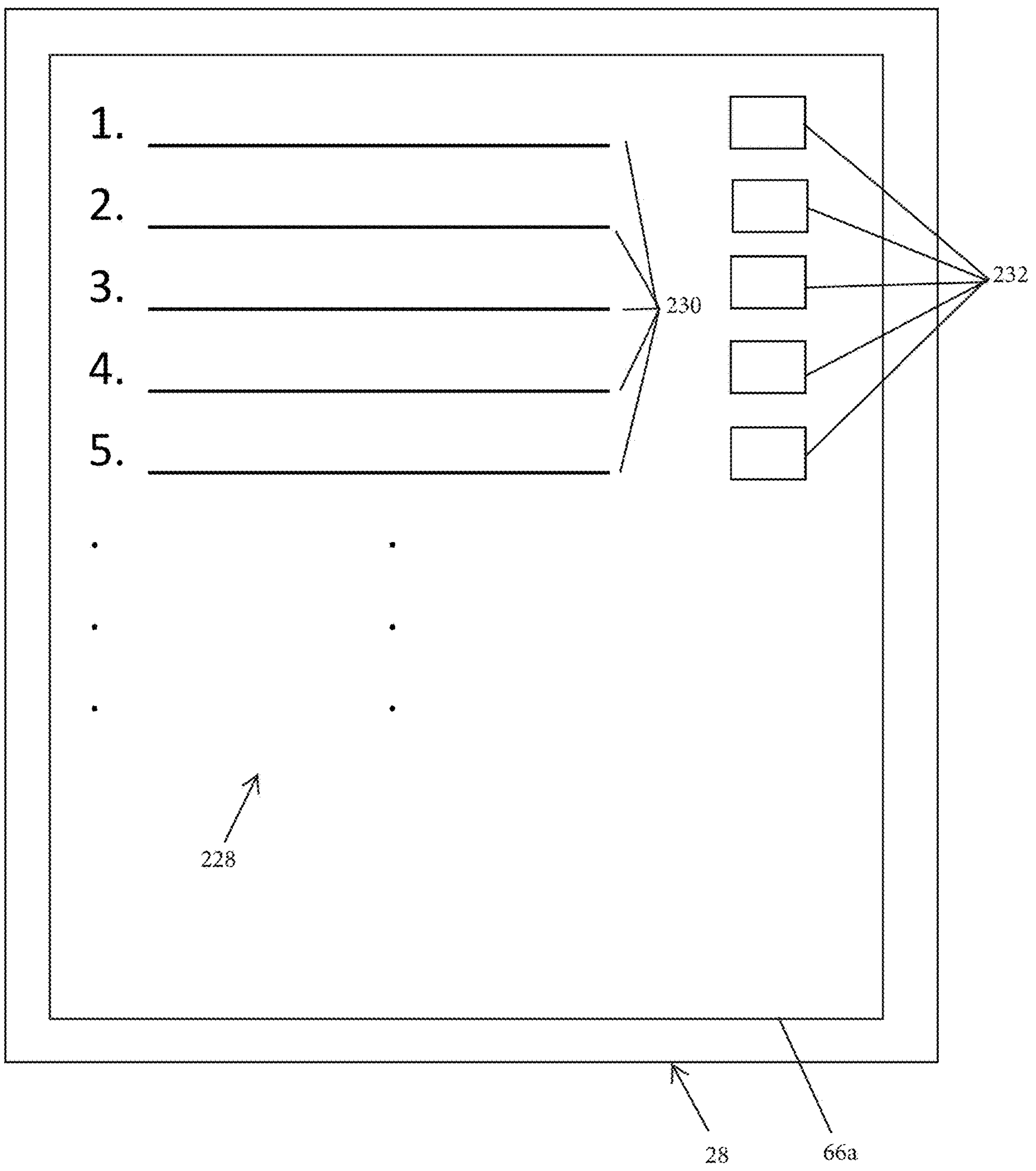
FIG. 5 illustrates calibration instructions displayed to a mechanic on a computer device for performing a calibration process in accordance with aspects of the present invention.

In the case of a static calibration, upon launching a supported calibration process via the associated button or field 226*a*, 226*b*, 226*c*, diagnostic computer tool 28 may cause a calibration process instruction file, such as A1 or B1 or C1 or D1, to display instructions 228 on screen 66*a* of tool 28, such as illustrated in FIG. 5, where the instruction file is selected based on the vehicle and/or safety system for which calibration is required. It should be appreciated that the electronically stored calibration data or information A, B, C, D associated with tool 228 may be provided for different vehicles and/or different systems within a given vehicle. Although only four groupings of data are shown in the illustrated embodiment of FIG. 3C, it should be appreciated that diagnostic computer tool 28 may include electronically stored calibration information for numerous other vehicles and/or systems, or even that diagnostic computer tool 28 may include calibration data for a single vehicle, and that such data may be located in a database of a remote computer and accessible by diagnostic computer tool 28.

Figure 6:
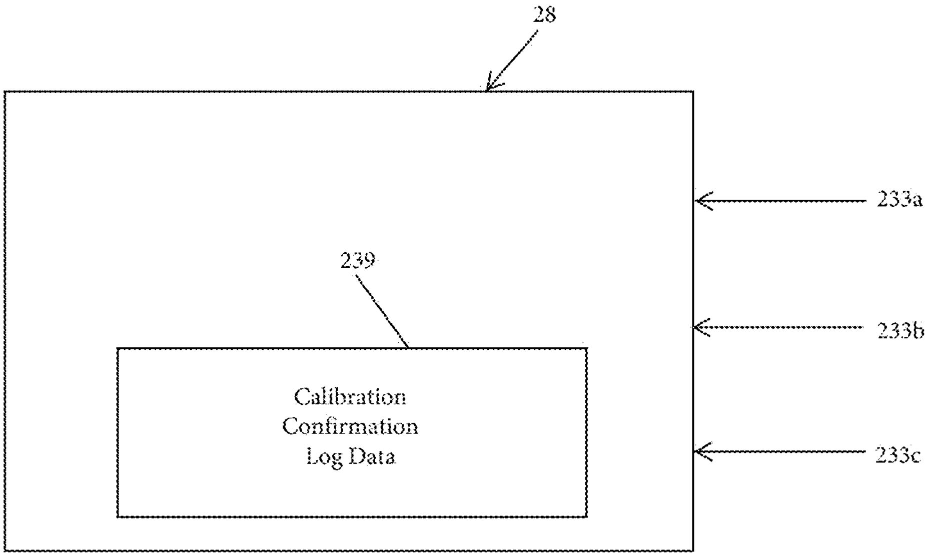
FIG. 6 illustrates calibration confirmation signals provided to the computer device during performance of the calibration instructions of FIG. 5.

As shown in FIG. 5, the instructions 228 include calibration steps 230 directing the operator 24 through the process of static calibration. Diagnostic computer tool 28, as discussed in more detail below, is configured and operable to capture data related to the calibration steps during the calibration process to log and record that the various processes have been performed and that acceptable results were obtained. The calibration steps 230 may sequentially provide operator 24 with details regarding how to setup and perform the calibration. In addition, in the illustrated embodiment of FIG. 5, calibration instructions 228 generated or displayed via the associated calibration process instruction file additionally include confirmation buttons or fields 232 that either require manual interaction by operator 24 to confirm completion of a given step, or may be automatically triggered based on actions by operator 24 or based on responses or signals from electronic system 23 of vehicle 22 or may be provided from a sensor associated with calibration equipment that is separate from vehicle 22, which thus result in confirmation signals being provided to tool 28 that a given step has been performed. Still further, confirmation signals indicating proper completion of particular calibration actions may be automatically provided or triggered without listing of a particular step. With reference to FIG. 6, calibration confirmation signals 233*a*, 233*b* and 233*c* are illustrated as being provided to diagnostic computer tool 28, where each of signals 233*a*, 233*b*, 233*c* may be generated or obtained from different sources. For example, a calibration confirmation signal 233*a* may result from an operator 24 acknowledging completion of a given step by way of a confirmation button or field 232 upon completion of the listed step, or the operator 24 may manually enter readings into tool 28 for purposes of comparison and verification, or the like. Alternatively, a calibration confirmation signal 233*b* may result from diagnostic computer tool 28 receiving a signal or a response from electronic system 23, or detecting a change in a parameter of electronic system 23, while connected to the electronic system 23. For example, diagnostic computer tool 28 may receive a signal from a safety system sensor of vehicle 22, or may detect that a fault has been cleared, or detect a change in a voltage or signal for a give ECU. Still further, a calibration confirmation signal 233*c* may be transmitted or received from a separate device or component, such as affiliated with calibration equipment. For example, as discussed in more detail below, a calibration target may include a sensor, such as a distance sensor, with diagnostic computer tool 28 being configured to receive a signal from such a sensor confirming that a particular setup distance is obtained. Or the calibration equipment may include vehicle wheel assembly alignment measurement information, such as from a non-contact wheel alignment sensor, with the data transmitted to diagnostic computer tool 28. Vehicle diagnostic system 10 may thus require confirmation of all steps of a calibration process in order to verify that the calibration was performed completely and properly.

Figure 7:
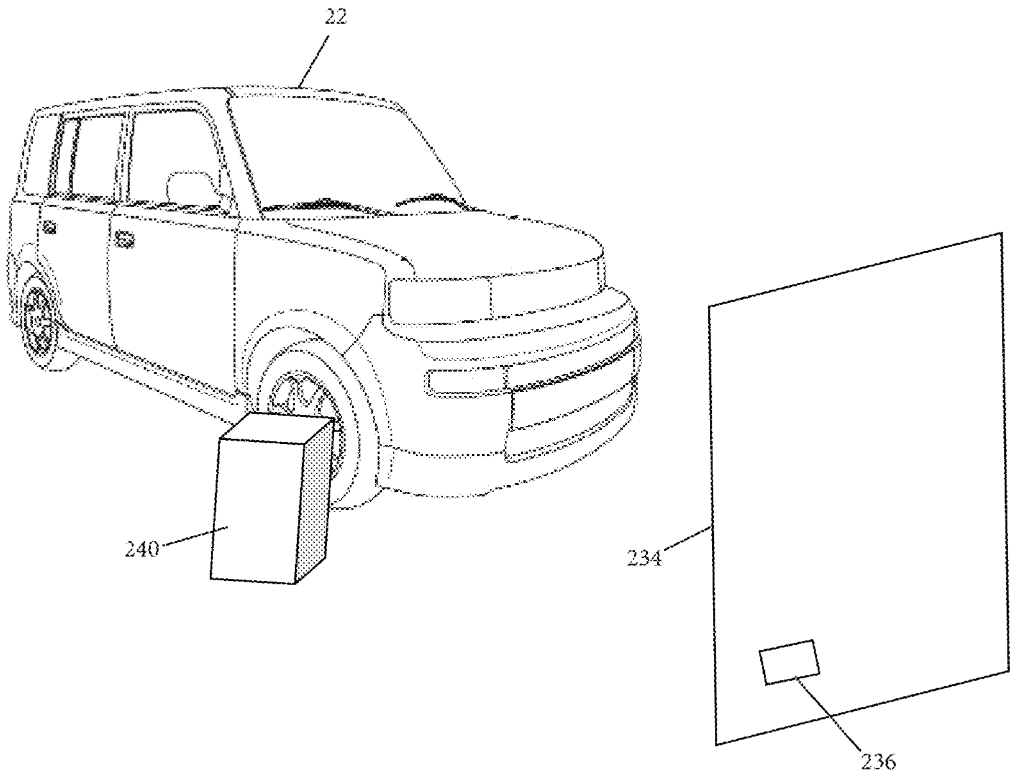
FIG. 7 illustrates a target arranged with respect to the vehicle of FIG. 1 for calibration of vehicle ADAS systems.

For example, particular safety systems 81*a*, 81*b*, 81*c* require the placement of a target about the vehicle 22, with sensors of the safety system 81*a*, 81*b*, 81*c* interacting with the target for purposes of calibration. In which case, calibration steps 230 may provide instructions for arranging such targets relative to the vehicle. For example, as illustrated in FIG. 7, target 234 is shown disposed in front of vehicle 22. Calibration steps 230 may thus provide instructions on where and how to locate or position target 234 relative to vehicle 22. Still further, target 234 itself may include sensors, such as a distance sensor 236, that is operable to provide a confirmation signal 233*c* to diagnostic computer tool 28 regarding the proper positioning of target 234 relative to vehicle 22.

Calibration steps 230 may prompt operator 24 to take a digital image of the calibration arrangement, such as the location and position of a target 234 relative to the vehicle 22. In one embodiment diagnostic computer tool 28 includes a digital camera or imager 238 (FIG. 2), with operator being prompted by a given calibration step 230 to use tool 28 to take a digital image of the arrangement, where the digital image is then saved in memory 50 of tool 28 or saved at a remote computer 64. Alternatively, system 10 may be configured to receive a digital image from a separate device, such as camera or mobile phone used by operator 24. Upon the digital image being saved to or via diagnostic computer tool 28, a confirmation signal may be transmitted with respect to the associated confirmation button 232.

Still further, a static calibration process may additionally or alternatively require wheel alignment data of vehicle 22, such as the toe, camber and/or caster of the wheel assembly, to be measured or determined, such as by using known or conventional wheel alignment measuring apparatuses or sensors, such as schematically illustrated at 240 in FIG. 7. The wheel alignment data may be entered into the diagnostic computer tool 28 by operator 24 or alternatively may be transmitted as an electronic signal or confirmation signal 233*c* from the wheel alignment measuring sensor 240 to the tool 28, where tool 28 may evaluate the wheel alignment data to confirm that it is within specifications.

Upon confirming that target 234 is properly arranged, a calibration operation may be performed in which a sensor associated with a given safety system 81*a*, 81*b*, 81*c* utilizes target 234 for calibration. The static calibration process may further include running a calibration program, such as launching an executable calibration program such as A2, B2, C2 or D2, depending on the given vehicle and/or safety system 81*a*, 81*b*, 81*c* requiring calibration. In the case of a calibration program residing on tool 28, the operator 24 may launch the program by way of a confirmation button 232 associated with a given one of the process steps 230, with tool 28 in turn receiving a confirmation signal upon completion or proper execution of the calibration program. It should be appreciated that alternative calibration programs may be utilized, such as calibration programs resident in the ECUs that may be launched by an operator 24 or may automatically launch when the ECU is placed in a particular mode, such as via tool 28. For example, as noted above, a calibration program may interface with an ECU in any of various known manners, including sending a command to begin a learn function with diagnostic computer tool 28 waiting for a response from the ECU indicating completion, or the calibration program may transmit persistent messages to an ECU for calibration, or the calibration program in diagnostic computer tool 28 may trigger or activate an internal OEM program of the ECU used for calibration.

Diagnostic computer tool 28 is thus configured to capture and record or log data 239 (FIG. 6) associated with the calibration steps 230 for static calibration to verify and confirm that calibration of safety systems 81*a*, 81*b*, 81*c* have been performed and achieve acceptable results. It should be appreciated that tool 28 may capture various forms of data or confirmation signals, including in the form of manual interaction by operator 24, or automatically triggered data such as based on actions by operator 24 or based on other triggers. Such data may include, for example, diagnostic scan data results from tool 28, wheel alignment data, button presses by operator 24, ECU signals or responses to queries, or other signals supplied by tool 28, data readings form ECUs, such as from sensors associated with ECUs, as well as other forms of confirmation signals. In addition to capturing and recording data associated with individual steps for calibration, diagnostic computer tool 28 additionally is configured to capture and record the calibration result, such as the confirmation of completion of a successful calibration.

Diagnostic computer tool 28 is likewise operable to guide and verify that a dynamic calibration required for a given safety system 81*a*, 81*b*, 81*c* has been properly completed. In like manner as discussed above, the operator 24 may launch a dynamic calibration process supported by the diagnostic computer tool 28 via the associated button or field 226*a*, 226*b*, 226*c*, which may involve depressing a touch screen, clicking with a mouse, highlighting and activating a field via a key stroke or other button on tool 28, or in another known computer interface manner. Upon launching a supported calibration process via the associated button or field 226*a*, 226*b*, 226*c*, diagnostic computer tool 28 may cause a dynamic calibration process instruction file, such as A3 or B3 or C3 or D3, to display instructions 228 on screen 66*a* of tool 28, such as illustrated in FIG. 5, where the instruction file is selected based on the vehicle and/or safety system for which calibration is required. It should be appreciated that the electronically stored calibration data or information A, B, C, D associated with tool 228 may be provided for different vehicles and/or different systems within a given vehicle. Diagnostic computer tool 28 in turn is configured to access and provide instructions to operator 24 for performing the dynamic calibration. For example, in similar manner to that as shown in FIG. 5, instructions 228 may be displayed for guiding an operator 24 through a dynamic calibration. This may include, for example, the distance to drive, speed, duration, instructions to turn, stop and the like. This may additionally include steps such as confirming that the tire pressure is correct, that the gas tank is sufficiently full, and that the vehicle 22 does not include additional cargo.

Diagnostic computer tool 28 is also configured and operable to receive calibration signals, such as 233*a*, 233*b* and/or 233*c*, to confirm completion of the dynamic calibration steps. For example, a calibration signal 233*b* may result from diagnostic computer tool 28 receiving a signal or a response from electronic system 23, or detecting a change in a parameter of electronic system 23, while connected to the electronic system 23. For example, diagnostic computer tool 28 may receive a signal from a safety system sensor of vehicle 22, or may detect that a fault has been cleared, or detect a change in a voltage or signal for a give ECU. Still further, diagnostic computer tool 28 may obtain other signals from electronic system 23 for use as calibration signals. For example, diagnostic computer tool 28 may obtain GPS data from the vehicle 22, tool 28 may query the vehicle instrument cluster of the electronic system 23 for the odometer reading before and after a dynamic test drive to confirm distance driven, tool 28 may use the vehicle speed sensor of the electronic system 23 for use in evaluating speed and/or distance. Alternatively, diagnostic computer tool 28 may include a GPS module or interface with a smart phone of operator 24 for monitoring distance and type of drive information, such as turns and the like.

Similar to the static calibration confirmation embodiment, the calibration instructions 228 generated or displayed via the associated calibration process instruction file for a dynamic calibration may additionally include confirmation buttons or fields 232. As the vehicle 22 progresses through the various steps associated with performing the dynamic test drive, the fields 232 may be indicated as completed. Such indication may come from the operator 24, such as by marking a field 232 to confirm that the operator 24 has completed the step, such as checking tire pressure, or confirming fuel level, or the like. Alternatively, the indication may be automatically provided vial the diagnostic computer tool 28 reading or obtaining data from electronic system 23 as noted above.

Diagnostic computer tool 28 is also configured to capture and record or log data 239 (FIG. 6) associated with the calibration steps 230 for dynamic calibration to verify and confirm that calibration of safety systems 81*a*, 81*b*, 81*c* have been performed and achieve acceptable results. It should be appreciated that tool 28 may capture various forms of data or confirmation signals, including in the form of manual interaction by operator 24, or automatically triggered data such as based on actions by operator 24 or based on other triggers. Such data may include, for example, diagnostic scan data results from tool 28, button presses by operator 24, ECU signals or responses to queries, or other signals supplied by tool 28, data readings form ECUs, such as from sensors associated with ECUs, as well as other forms of confirmation signals. In addition to capturing and recording data associated with individual steps for calibration, diagnostic computer tool 28 additionally is configured to capture and record the calibration result, such as the confirmation of completion of a successful calibration.

Upon completing all of the steps and running of the associated calibration programs, diagnostic computer tool 28 may be returned to display checklist 26, which is then updated to reflect that a successful calibration of the ADAS system has been performed. For example, the mechanic 24 may navigate to the checklist 26 screen via computer 30 and manually toggle the associated field 126*a*, 126*b* or 126*c* of checklist 26 to indicate that the calibration has been performed. Alternatively, upon successfully calibrating the given ADAS system, system 10 may automatically return to the screen 66*a* display of the checklist 26 and automatically toggle the associated field 126*a*, 126*b*, or 126*c* upon completion of the calibration event. System 10 may then additionally record the successful calibration event, or indication thereof, to a work file 83 (FIG. 1), where work file 83 may be retained in memory on computer 30 and/or server 64.

System 10, such as via diagnostic computer tool 28, may additionally transmit a report comprising work file 83 or based on work file 83, such as to remote computer device 64 or another remote computer. In the illustrated embodiment the work file 83 includes the captured and recorded calibration log data 239 comprising the confirmation data associated with completion of the calibration steps, as well as data of the associated successful calibration completion. Such a report may be transmitted to a shop owner, insurance estimator, insurance company, the vehicle owner, or the like. In a particular embodiment the report may be transmitted to a vehicle repair estimating software system, or the like. For example, a remote computer such as computer 64 may include vehicle estimating software 265. The estimating software 265 may have been used to generate the repair order, with the report being used as confirmation of completion, as well as for documenting such as for insurance purposes. The estimating software may be, for example, provided by Audatex North America, Inc. or by Enlyte Group, LLC, such as under its MITCHELL brand of estimating software. As noted, the report may include indication of successful completion of the calibration of all ADAS systems identified in the checklist 26 as requiring calibration, and in particular may include the calibration log data 239. The report may additionally include or cause an invoice to be generated for transmittal, as well as generate or cause a revenue sharing portion to be provided to the shop using system 10.

It should be understood that diagnostic computer tool 28 may not include all necessary calibration files 50*c* for all ADAS systems, such as for all makes, models and years of vehicles. In which case, checklist 26 will so indicate. Such unsupported ADAS systems may then require calibration via alternative means, such as directly through an OEM procedure that may be provided at an authorized dealer, or using specific equipment and systems, including calibration files, provided by a given OEM.

Still further, although diagnostic computer system 28 is shown and described in the illustrated embodiment above as including calibration files 50*c* retained within memory 50 of computer 30, it should be appreciated that some or all of the calibration function operations may be accomplished via a remote computer system 64. For example, calibration files 50*c* may be retained remotely and/or some aspects of the calibration function may be divided between a remote computer system 64 and the local computer 30. Still further, system list program 45 may communicate with remote server 64 to confirm that a calibration has been completed, such as for example if calibration files 50*c* are retained on server 64, including for example calibration programs. System 10 may additionally enable a mechanic 24 to obtain remote assistance, such as from a remote technician at computer system 64 via Internet connection 70.

Figure 8:
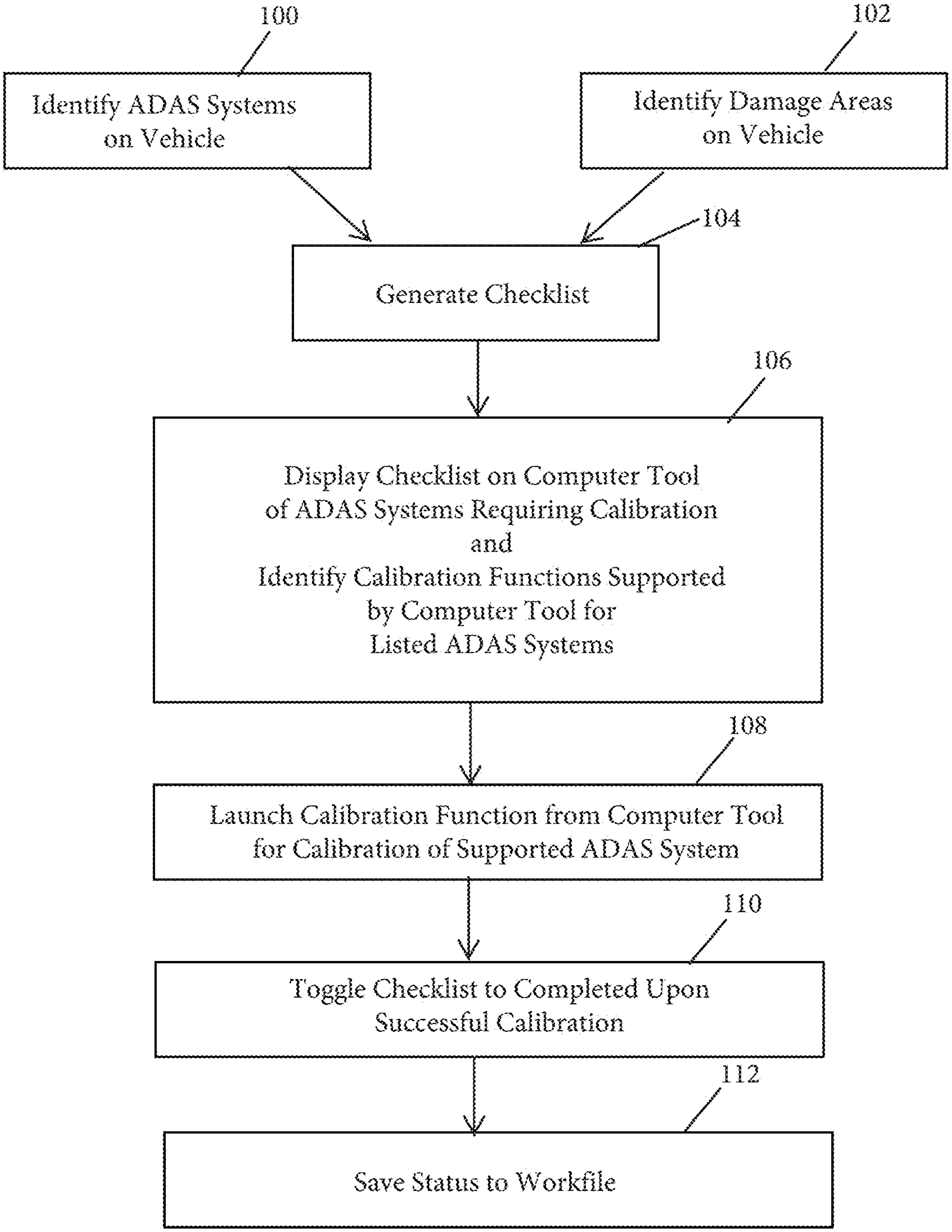
FIG. 8 is a flow chart illustrating aspects of the vehicle diagnostic method in accordance with the present invention by which the vehicle diagnostic computer tool provides a system checklist to an operator.

FIG. 8 illustrates the general process of use of diagnostic system 10 for generating and using checklist 26. Step 100 is identification of ADAS systems present on a vehicle and step 102 is identification of damage areas on the vehicle, where the identification of the ADAS systems and damage areas may be performed as detailed above. The checklist 26 is then generated at step 104, such as via system list program 45. Subsequently, as illustrated at step 106, the checklist 26 is displayed to a mechanic, such as on a screen 66*a* of computer 30, along with displaying which of the ADAS systems listed on the checklist 26 are supported with calibration functions by the diagnostic computer tool 28.

As understood from step 108, mechanic 24 may launch a calibration operation via checklist 26 and diagnostic computer tool 28. As discussed above, diagnostic computer tool 28 is operable to provide static and dynamic calibration instructions to mechanic 24, with tool 28 recording calibration signals confirming completion of the required calibration steps, along with recording successful completion of the static or dynamic vehicle calibration. The recorded data is logged for providing in a report to document that the calibration was performed and performed successfully.

At step 110, upon successful completion of the calibration of an ADAS system listed on checklist 26, the status identification shown on checklist 26 may be toggled to complete. This step 110 may be done for each of the ADAS systems listed on checklist 26 as requiring calibration. Moreover, the identification of having completed calibration may be automatically generated by way of system list program 45 communicating with calibration files 50*c*, including if calibration files 50*c* are maintained on computer tool 28 and/or if maintained on remote server 64. And as illustrated at step 112, records of the completed calibrations may then be saved in a work file 83 regarding the repair work for the vehicle 22. Upon completion of the calibration operations, the mechanic 24 may then run a post scan using one of the diagnostic scanning application programs 53*a*, 53*b* for confirmation of completion of repairs to vehicle 22. Moreover, vehicle diagnostic computer tool 28 may additionally be configured to prevent performance of a post scan until confirmation has been entered that all required or suggested calibrations have been performed. As noted above, such confirmation of completion of a calibration may be by an operator toggling the indication on screen 66*a*, or may be automated via diagnostic computer tool 28 after successful calibration via program files 50*c*.

With further regard to determination of the ADAS systems present on vehicle 10 at step 100, system 10 may additionally employ or use a vehicle ADAS database 49, where database 49 includes information regarding all possible ADAS modules that may have been available for a given make, model and year of vehicle. For example, as noted above, diagnostic tool 28 may query electronic system 23 to obtain the VIN of vehicle 22, or the mechanic 24 may enter the VIN into diagnostic tool 28, such as a mechanic input 47. Alternatively, the mechanic may input the make, model and year of the vehicle 22 as a manual input. Based on the determined and decoded VIN and/or the make, model and year of the vehicle 22, database 49 is operable to determine what possible ADAS modules or systems may have been available for the vehicle 22.

In one embodiment, VIN database 37 and/or ADAS database 49 are located remotely from the vehicle repair facility and accessed by diagnostic tool 28, such as being retained within remote server 64 and accessed via a wireless Internet connection 70. Alternatively, databases 37 and 49 may be combined with database 50*b*, either remotely or locally. Likewise, system list program 45, diagnostic evaluation program 51, and/or diagnostic scan programs 53*a*, 53*b* may also be located remotely and be accessed by diagnostic computer tool 28. Alternatively, all or any of system list program 45, diagnostic evaluation program 51, and/or diagnostic scan programs 53*a*, 53*b* are contained within memory 50 of diagnostic tool 28, as discussed above. Still further, it should be additionally appreciated that programs 45, 50*c* 51, 53*a*, 53*b* may each comprise multiple subparts or routines that operate together. It should be further appreciated that inputs 21, such as vehicle safety system inputs 19, restraint deployment inputs 31 and/or damage inputs 35 may be variables that are used by or entered into system list program 45.

In a further particular alternative embodiment, system 10 may query the electronic system 23 of the vehicle 22 to obtain the part numbers of all ECUs resident on vehicle 22, where the ECU part numbers are readable via interface module 27 and the connection with OBD diagnostic port 32.

An exemplary embodiment of a database 50*b* configured as an ECU database is illustrated in FIG. 3B. As there shown, database 50*b* includes a listing of ECU part numbers 82*a*, 82*b*, 82*c*, such as for one particular make and model of vehicle, with the ECU part numbers being correlated with vehicle systems 81*a*, 81*b*, 81*c*, where the vehicle systems 81*a*, 81*b*, 81*c* in the illustrated embodiment are ADAS systems such as a forward facing lane keeping assist system, an adaptive cruise control system, and a collision avoidance system. It should be appreciated that although database 50*b* is illustrated in FIG. 3B to include three separate ECU part numbers associated with three separate vehicle systems, in practice a vehicle may be equipped with dozens or hundreds of ECUs where by the ECU database may include numerous listings of ECU part numbers as well as numerous vehicle systems. It should be appreciated that database 50*b* may include both ECU part numbers and addresses, which may be correlated or combined together.

The vehicle database 50*b* may further comprise a VIN/ECU part number database that includes a listing of ECU part numbers associated with a given VIN. Therefore, based upon a review of the VIN database and a review of the ECU part numbers associated with the current vehicle's VIN, a selection may be made between a third party supplied scanning program or a manufacturer supplied scanning program. For example, if the VIN database reveals that a given vehicle contains one or more ECU part numbers associated with ADAS ECUs, a decision can be made to select the more comprehensive manufacturer supplied scanning program. In the alternative, if a review of the VIN database reveals that the vehicle is not equipped with ADAS ECUs, the faster and less costly third-party supplied scanning program may be utilized. Such a decision may be aided if the VIN entry in the VIN database for an ADAS equipped vehicle includes at least one part number of an ADAS ECU associated with the VIN. Alternatively, the VIN entry in the VIN database for an ADAS equipped vehicle may include some other indication in the VIN database that the VIN is associated with an ADAS equipped vehicle. Therefore, if a vehicle's VIN entry in the VIN database does not include an ADAS ECU part number or some other indication that the VIN is for an ADAS equipped vehicle, the third-party supplied scanning program may be selected.

Still further, system 10 may be configured to accept operator input to obtain vehicle data information. For example, system 10 may prompt an operator 24 to enter vehicle make and model information, such as via interface 66. System 10 may then also provide step-by-step inquiries to operator 24 regarding systems installed on vehicle 22, such as whether vehicle 22 includes particular cameras at particular locations, or specifically whether vehicle 22 has particular ADAS systems. Accordingly, system 10 instead of automatically launching a diagnostic scanning program 53*a*, 53*b* to be run after diagnostic evaluation program 51 queries vehicle electronic system 23 to determine which vehicle systems 81*a*, 81*b*, 81*c* are present on vehicle 22, or prior thereto, system 10 may instead provide a recommendation of whether to run an aftermarket diagnostic scan program 53*a* or an OE diagnostic scan program 53*b*, in particular based on various scan inputs 21.

Although database 50*b* is disclosed above as residing in diagnostic computer tool 28, such a database may additionally or alternatively reside in the memory of a remote computer, such as a remote server 64. If the database is located in a remote server 64, the vehicle interface tool 28 may access the database via an Internet interface. Optionally, the database, such as a database found on the remote computer or server 64, may be a compiled database of VINs and/or ECUs provided by a third party. Still further, the database found in the memory of the vehicle interface tool 28 may be a local database that comprises a portion of the information, where the database found on the remote computer or server 64 is remote and contains additional or alternative information. For example, the database may be progressively expanded to include those VINs and/or associated ECU part numbers for vehicles previously serviced at a particular service station or automotive repair business. Optionally, the database may be updated, such that an operator may add a new vehicle VIN and associated ECU part numbers. The database may thus be a tool for identifying which vehicles are equipped with ADAS subsystems.

Diagnostic tool 28 may, either in addition to the above noted various loaded diagnostic applications or in place thereof, be used to access remotely located diagnostic applications, such as that may reside on remotely located servers 64. This may be done, for example, to avoid the need for obtaining and locally storing and maintaining diagnostic applications on diagnostic tool 28. In the illustrated embodiment, diagnostic tool 28 includes an input/output (I/O) interface 66 for coupling to peripheral devices, such as one or more of a monitor, keyboard, mouse, and the like. In a further illustrated embodiment, the diagnostic tool 28 is implemented as a laptop computer with integrated monitor, keyboard, and mouse.

As an alternative to providing checklist 26 on screen 66 of computer 30, diagnostic computer tool 28 may instead or in addition output the associated data of checklist 26 to a report. For example, an electronic data file may be generated by the vehicle diagnostic computer tool 28 that may be provided to another computer device and/or may be printed. The electronic data file may list the vehicle safety systems equipped on the vehicle requiring calibration. Still further, the output data file may also include calibration information for safety systems supported by the diagnostic computer tool 28. For example, the calibration information may comprise calibration instructions that may be separately printed or displayed on another computer to provide human readable instructions for calibrating safety systems.

System 10, in addition to performing scanning operations, may also be used for reprogramming of vehicle 22, such as reprogramming selected ECUs, including reprogramming ECUs based on a determination of particular fault codes.

Although vehicle interface diagnostic tool 28 is discussed above as conforming with the SAE J2534 standard, it should be appreciated that alternatively configured vehicle diagnostic and programming tools may be employed within the scope of the present invention, including alternatively configured tools for alternative types of vehicles, such as alternative classes of vehicles. Accordingly, an interface tool may conform with the ISO 22900 standard, or RP1210 standard, or may operate under the ELM327 command protocol.

As noted, the software and/or hardware of diagnostic and programming tools may be required to be updated to operate with new vehicles and/or enable programming and diagnosing of existing vehicles. In the above noted embodiments the vehicle interface diagnostic tool 28 may be periodically updated via an Internet connection, or may be returned to the supplier for updating, including with regard to hardware updates. This may be done by the supplier of the vehicle interface diagnostic tool 28 whereby the local operator 24 need not spend time attempting to maintain the equipment.

In the illustrated embodiment vehicle interface diagnostic computer tool 28 is disclosed as including both the diagnostic evaluation program 51 as well as multiple diagnostic scanning programs 53*a*, 53*b*. It should be appreciated that alternative arrangements may be employed within the scope of the present invention. For example, program 51 and/or programs 53*a*, 53*b* may reside on different devices. For example, an operator 24 may first utilize one device with a diagnostic evaluation program 51 to determine which diagnostic evaluation program is appropriate for the vehicle 22, and then select from alternative computer devices to run the determined diagnostic evaluation program. Still further, although diagnostic evaluation program 51 and diagnostic scanning programs 53*a*, 53*b* are illustrated and discussed herein as being separate programs, one or more of such programs may be combined together and operate as subroutines.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of calibrating vehicle safety systems on a vehicle, said method comprising:

providing a vehicle diagnostic system comprising a vehicle diagnostic computer tool, and connecting the vehicle diagnostic computer tool to a diagnostic port of a vehicle to be in communication with an electronic system of the vehicle, wherein the vehicle diagnostic computer tool is a portable device;

determining vehicle safety systems present on the vehicle via the vehicle diagnostic computer tool;

generating a list of one or more vehicle safety systems equipped on the vehicle requiring calibration;

providing to a user via the vehicle diagnostic computer tool the list of vehicle safety systems equipped on the vehicle requiring calibration;

providing to the user calibration instructions for a selected one of the vehicle safety systems via the vehicle diagnostic computer tool, wherein the calibration instructions provide directions for calibration of the selected one of the vehicle safety systems requiring calibration;

performing calibration of the selected one of the vehicle safety systems requiring calibration while the vehicle diagnostic computer tool is connected to the diagnostic port of the vehicle, wherein calibration of the selected one of the vehicle safety systems comprises a calibration operation that is selected and initiated with the vehicle diagnostic computer tool and then performed for completing the calibration, and wherein the calibration operation is monitored by the vehicle diagnostic computer tool;

receiving and recording calibration confirmation signals with the vehicle diagnostic computer tool during the calibration operation while the selected one of the vehicle safety systems is calibrated per the calibration instructions, wherein the calibration confirmation signals comprise at least one of data signals from the electronic system of the vehicle or manual entry signals to the vehicle diagnostic computer tool that correspond to steps of the calibration operation and provide an indication that an associated step of the steps has been completed; and confirming with the vehicle diagnostic computer tool completion of the calibration of the selected one of the vehicle safety systems upon the vehicle diagnostic computer tool receiving all expected and predetermined calibration confirmation signals associated with the calibration operation.

2. The method of claim 1, wherein the calibration comprises a static calibration in which the vehicle is stationary.

3. The method of claim 2, wherein at least some calibration confirmation signals comprise a manual entry to the diagnostic computer tool by the user.

4. The method of claim 2, wherein at least some calibration confirmation signals are detected by the vehicle diagnostic computer tool from the vehicle electronic system.

5. The method of claim 1, wherein the calibration comprises a dynamic calibration in which the vehicle is driven.

6. The method of claim 5, wherein at least some calibration confirmation signals are detected by the vehicle diagnostic computer tool from the vehicle electronic system.

7. The method of claim 1, wherein the vehicle diagnostic computer tool includes a display screen, and wherein the method further comprises displaying on the display screen of the vehicle diagnostic computer tool the list of vehicle safety systems equipped on the vehicle requiring calibration.

8. The method of claim 7, wherein said providing to the user calibration instructions via the vehicle diagnostic computer tool comprises providing a user selectable link to the specific calibration instructions for the selected one of the vehicle safety systems via the display screen.

9. The method of claim 8, wherein the calibration instructions are retained in a memory of the vehicle diagnostic computer tool.

10. The method of claim 8, wherein the calibration instructions are retained at a remote computer and are accessed by the vehicle diagnostic computer tool via an internet connection.

11. The method of claim 1, further comprising generating a log data report comprising the recorded calibration confirmation signals.

12. The method of claim 11, wherein the log data report is generated at the vehicle diagnostic computer tool, and further comprising transmitting the log data report from the vehicle diagnostic tool to a remote computer.

13. The method of claim 11, further comprising transmitting the received and recorded confirmation signals to a remote computer, and wherein the log data report is generated at the remote computer.

14. A system for calibrating vehicle safety systems on a vehicle, said system comprising:

a vehicle diagnostic computer tool, wherein the vehicle diagnostic computer tool includes a display screen, wherein the vehicle diagnostic computer tool is configured to be connected to a diagnostic port of a vehicle to be in communication with an electronic system of the vehicle, and wherein the vehicle diagnostic computer tool is a portable device;

wherein said vehicle diagnostic computer tool is configured to determine vehicle safety systems present on the vehicle and is configured to display on the display screen a list of vehicle safety systems equipped on the vehicle requiring calibration; and wherein said vehicle diagnostic computer tool via the list of vehicle safety systems requiring calibration on the display screen is operable to provide a link to calibration instructions for at least selected ones of the vehicle safety systems requiring calibration by a calibration operation; and wherein said vehicle diagnostic computer tool is configured to select and initiate a calibration operation, and to receive and record calibration confirmation signals during the calibration operation for calibration of vehicle safety systems per the calibration instructions, wherein said vehicle diagnostic computer tool is configured to monitor the calibration operation, wherein the calibration confirmation signals comprise at least one of data signals from the electronic system of the vehicle or manual entry signals to the vehicle diagnostic computer tool that correspond to steps of the calibration operation and provide an indication that an associated step of the steps has been completed; and wherein said vehicle diagnostic computer tool is configured to confirm completion of the calibration of the selected one of the vehicle safety systems upon said vehicle diagnostic computer tool receiving all expected and predetermined calibration confirmation signals associated with the calibration operation.

15. The system of claim 14, wherein at least some calibration confirmation signals comprise a manual entry to the vehicle diagnostic computer tool by the user or are detected by the vehicle diagnostic computer tool from the vehicle electronic system.

16. The system of claim 14, wherein the vehicle diagnostic computer tool provides user selectable links to specific calibration instructions for the selected ones of the vehicle safety systems requiring calibration.

17. The system of claim 14, wherein said vehicle diagnostic computer tool is configured to generate a log data report comprising the recorded calibration confirmation signals.

18. The system of claim 14, wherein said vehicle diagnostic computer tool accesses the calibration instruction from at least one of a memory of said vehicle diagnostic computer tool or a remote computer via an internet connection.

* * * * *